(No Model.) 4 Sheets—Sheet 1.

A. SMITH.
CORN HUSKING MACHINE.

No. 500,434. Patented June 27, 1893.

WITNESSES:
M. D. Blondel
Jos. A. Ryan

INVENTOR
Augustus Smith.
BY Munn & Co
ATTORNEYS.

(No Model.) 4 Sheets—Sheet 2.

A. SMITH.
CORN HUSKING MACHINE.

No. 500,434. Patented June 27, 1893.

WITNESSES:
M. D. Blondel
Jos. A. Ryan

INVENTOR
Augustus Smith.
BY
Munn
ATTORNEYS.

(No Model.) 4 Sheets—Sheet 3.
A. SMITH.
CORN HUSKING MACHINE.
No. 500,434. Patented June 27, 1893.
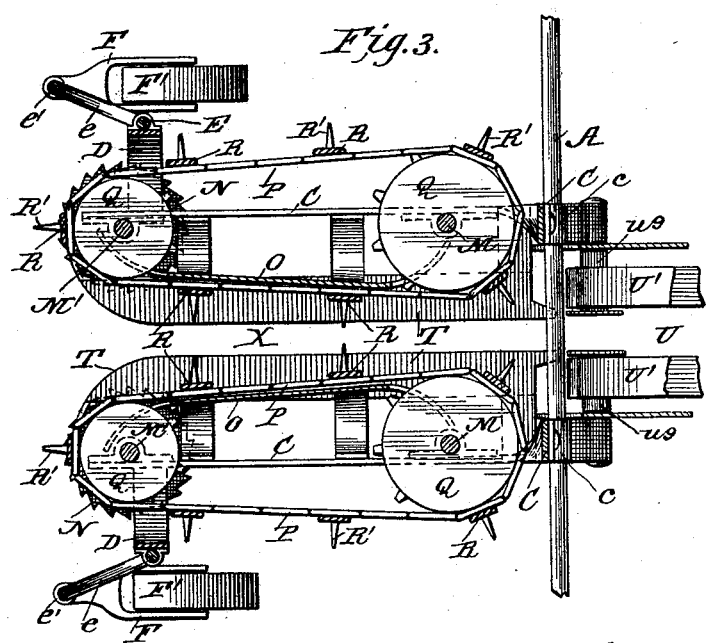
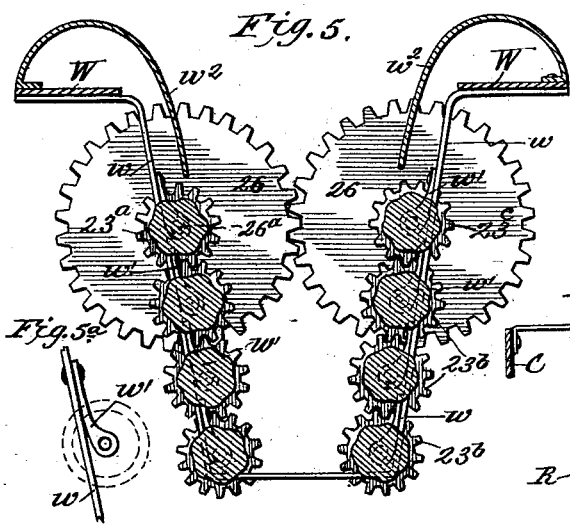
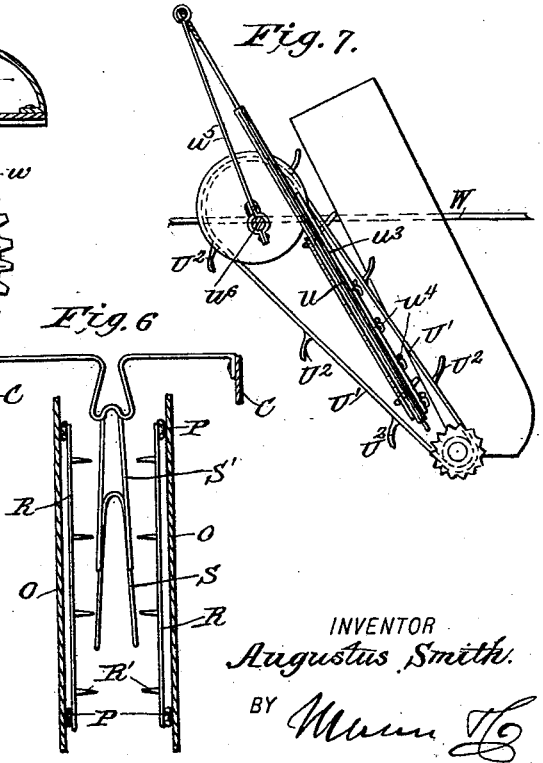
WITNESSES:
INVENTOR
Augustus Smith.
BY Munn & Co
ATTORNEYS.

(No Model.) 4 Sheets—Sheet 4.

A. SMITH.
CORN HUSKING MACHINE.

No. 500,434. Patented June 27, 1893.

WITNESSES:

INVENTOR
Augustus Smith.
BY Munn & Co
ATTORNEYS.

UNITED STATES PATENT OFFICE.

AUGUSTUS SMITH, OF SCOTLAND, SOUTH DAKOTA, ASSIGNOR OF FOUR-TENTHS TO JULIA H. SPANNAGEL, MARTIN SCHAMBER, JACOB RESNER, AND FRIEDRICH FRASCH, OF SAME PLACE.

CORN-HUSKING MACHINE.

SPECIFICATION forming part of Letters Patent No. 500,434, dated June 27, 1893.

Application filed August 29, 1892. Serial No. 444,464. (No model.)

*To all whom it may concern:*

Be it known that I, AUGUSTUS SMITH, residing at Scotland, in the county of Bon Homme and State of South Dakota, have invented a new and Improved Corn-Husking Machine, of which the following is a specification.

My invention has for its object to provide a corn husking machine which will serve to snap the corn from the stalk, and then husk it in a simple, rapid and effective manner.

With numerous other objects in view all of which will appear in the appended description, my invention consists in the novel features of construction and combination, hereinafter described, and more especially pointed out in the claims, reference being had to the accompanying drawings in which—

Figure 1:
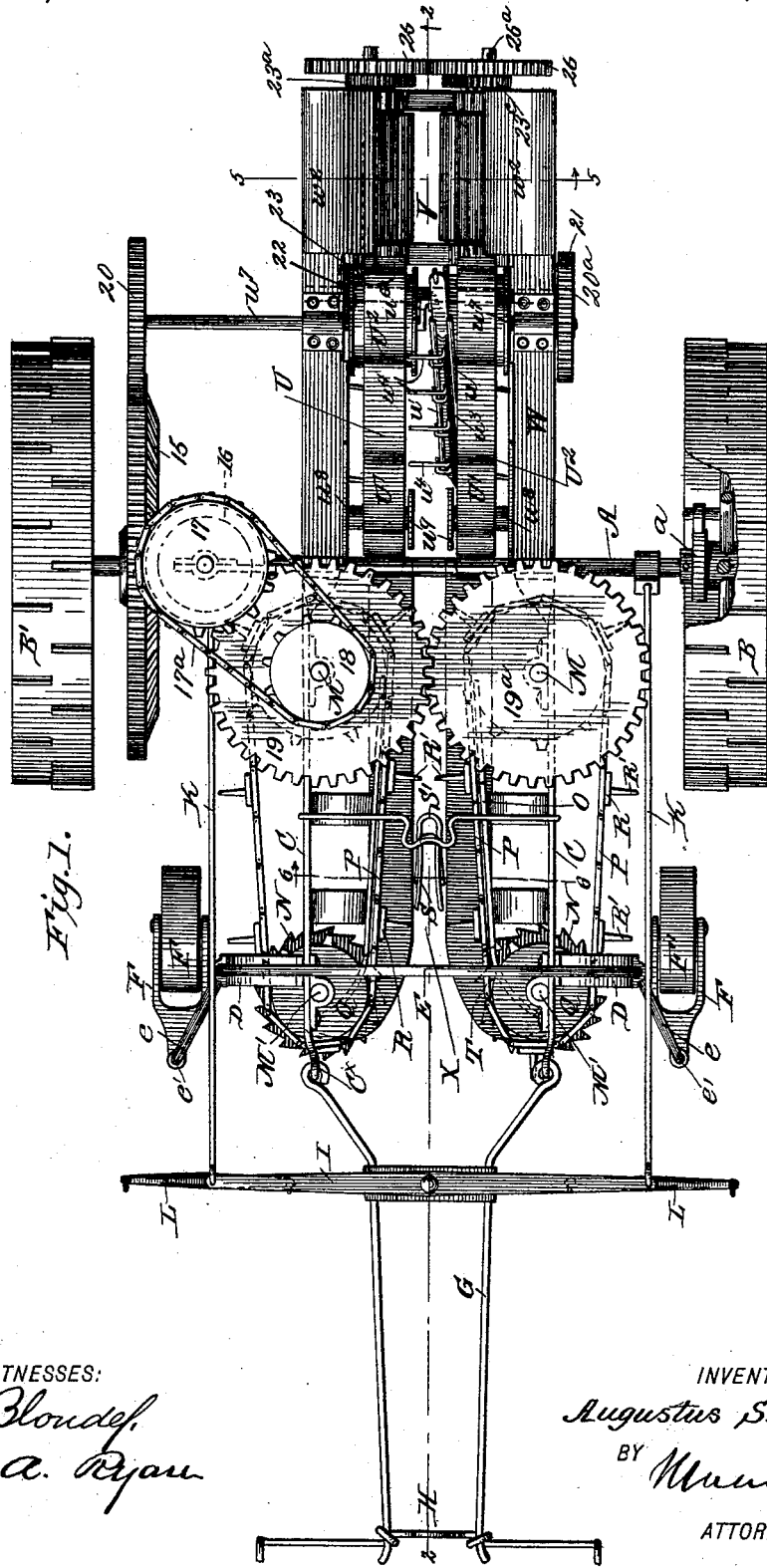
Figure 2:
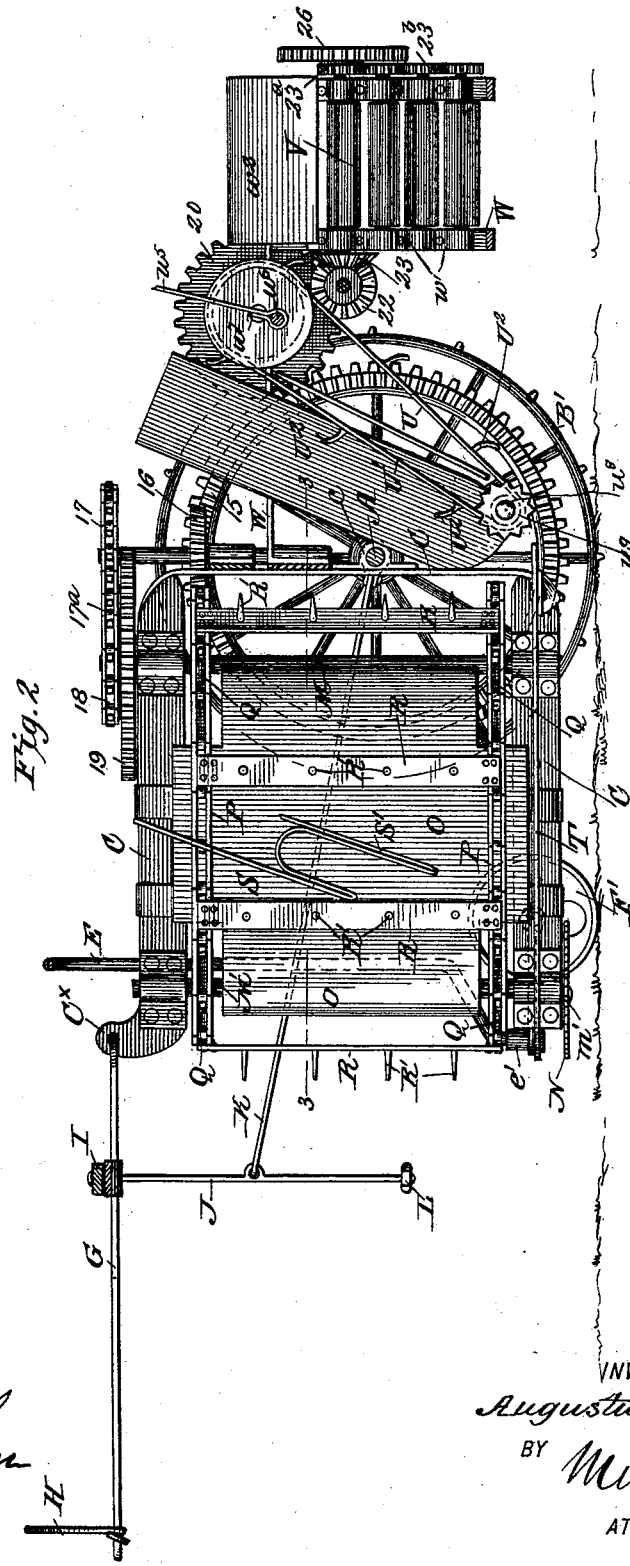
Figure 4:
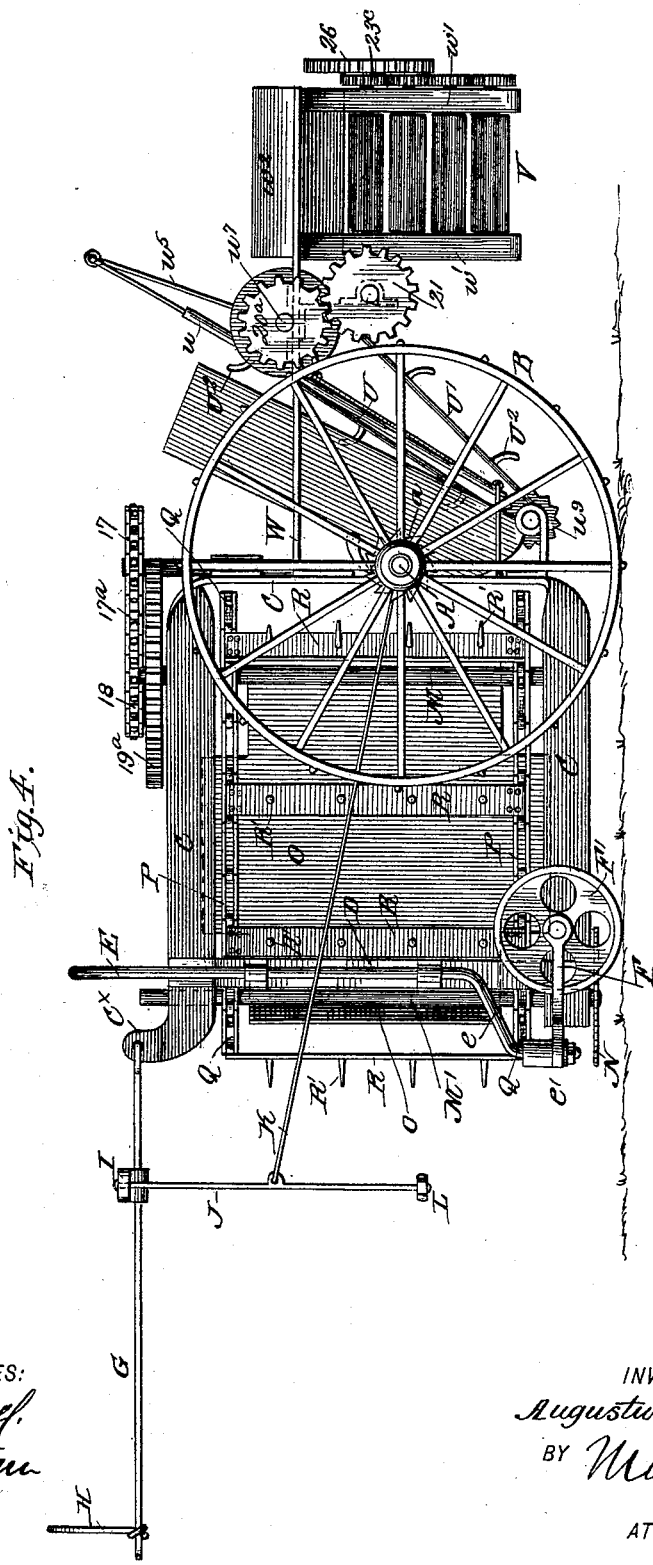

Figure 1 is a top plan view of my improved husking machine. Fig. 2 is a vertical longitudinal section thereof, on the line 2—2 Fig. 1. Fig. 3 is a horizontal section on the line 3—3 Fig. 2. Fig. 4 is a side view. Fig. 5 is a detail cross section on the line 5—5 Fig. 1, and Fig. 5$^a$ is a detail view of the spring bearing hereinafter referred to. Fig. 6 is a front view thereof.

Referring to the accompanying drawings A indicates the main axle upon which are loosely mounted the drive wheels B B' each of which have movable clutch members which are adapted to be shifted into or out of gear with clutch collars $a\ a$ fixedly held on the drive shaft whereby the operating mechanism can be held from movement, during transportation of the machine across the field. A pair of yoke shaped frames C C are supported at their rear ends on the axle A, by the cuff members $c\ c$, such frames being arranged at each side of the center of the machine, and extended longitudinally forward, their front ends being connected by means of the angular standards D D with a front support, consisting of an arched bar E the lower ends of which are bent horizontally forward as at $e$ and form pintles $e'\ e'$ upon which are journaled the bails F, on which are journaled the front or trailing wheels F'. The forward ends of the upper members of the yoke frame have apertured ears C$^×$ in which are secured the ends of two tongues G, which straddle the corn row, and which have the usual yoke H attached to their front ends. Upon the tongues G is mounted a single tree I, to the ends of which depending rods J are secured which are connected about midway to rods K the rear ends of which are connected to the drive axle A, while to the extreme lower ends of the rods J are hung the single trees L, as most clearly shown in Fig. 6 of the drawings.

In the front and rear ends of the frames C, are journaled the coincident vertical shafts M M' one pair being arranged to each side of the corn row passage the forward ones (M') of such shafts, extending below the lower bars of the frames, as at $m'$, upon which, are secured the toothed disks N N, which in connection with the gatherers presently described serve to draw the stalk into the passage way X formed by the side guards or shield plates O secured to the yoke frames C as shown most clearly in Figs. 1 and 2, such guard plates also preventing the ears of corn falling through to one side, as the gatherers draw them inward. The gatherers consists of endless chains P P which pass over sprocket wheels Q Q on the shafts M M', and which are connected by a series of vertical plates R, having outwardly projecting fingers R'. Projected down into the passage X between the gatherers, are two metal loop fingers S S' the rear one being at a lower plane than the forward one, between which the stalks are driven and which together with the gatherers serve to separate the ears from the stalk.

T are wide metal plates projected horizontally inward at the bottom of the machine, which narrow the width of the stalk passage and prevent the ears falling to the ground as they are separated from the stalk, such ears as they rest upon such bars T being drawn rearward onto the elevator U from whence they are elevated into the husker V.

The elevator U which is most clearly shown in Fig. 2 consists of a pair of endless belts U' provided with projecting lifting fingers or buckets U$^2$ such belts being practically a continuance of the ways or plates T, the reduced passage way being also continued and inclined upward between such belts.

In the inclined passage way is arranged what I term a "snapper" which plays back and forth in the passageway, such device consisting of an upwardly projecting plate $u$ fixedly held between the elevator belts, such plate having guide flanges $u'$ in which is held to reciprocate a bar $u^3$ which has fingers $u^4$ projected laterally over the inclined passage, and such plate is operated by a pitman $u^5$ connected to a crank portion $u^6$ on the upper elevator shaft $u^7$. The lower elevator shaft $u^8$, has inwardly projecting tooth disks $u^9$, which assist in bringing the ears to the elevator.

The husker V the construction of which is most clearly shown in Fig. 5 is supported upon the rear ends of the horizontal beams W of the main frame, which beams, it should be stated also support the upper end of the elevator U.

On hangers $w$ secured to beams W are arranged a series of spring bearing plates $w'$ in which are journaled a series of corrugated husking rollers, arranged in the same longitudinal plane with the elevator belts, between which the ears of corn are discharged from such elevator, suitable shield or guide plates $w^2$ being arranged at the upper end of the husker to form a receiving hopper into which the ears fall.

By journaling the corrugated rollers in yielding bearings, they are adapted to be spread apart by large ears to permit an easy passage therethrough.

Secured to the shaft A, is a large drive gear 15, which meshes with a gear 16 on a vertical shaft journaled in the main frame, which shaft is also provided with a chain wheel 17, which is connected by the chain 17$^a$ with a sprocket wheel 18 on one of the rear gatherer shafts M, which shaft has a large gear 19 which meshes with a similar gear 19$^a$ on the opposite shaft M, such arrangement of gears serving to drive the gatherer in the proper direction.

20 indicates a gear on one end of the upper elevator shaft which gears with the main gear wheel 15, and 20$^a$ is a gear on the opposite end of such shaft, which meshes with a gear 21 on a shaft journaled in the frame under the elevator, which shaft has a bevel gear 22, which meshes with a bevel gear 23 on the shaft of the upper one of the husking rollers at one side, which shaft has at its opposite end a small gear 23$^a$ which drives the gears 23$^b$ on the shafts of the rollers arranged under it, the rollers on the opposite side being similarly geared with each other and are driven by means of a large gear 26 on the upper shaft 26$^a$ which gears with a similar gear 23$^c$ on the end of the shaft of the opposite upper roller.

From the foregoing description taken in connection with the drawings it will be readily apparent, that in operation the tongues straddle the row, and as the machine is drawn along the toothed disks at the front end, will draw the corn inward toward the gatherers, which will engage the ears on stalk and force the stalk inward and downward against the loop fingers in the passage way, and as the stalk is forced therebetween the ears will be snapped off from it and drop onto the lower horizontal guard plates, over which they will be drawn rearward by the lower gatherer fingers, onto the elevator. As the stalk passes under the lower edge of the elevator such ears as may cling to the lower end of the stalk will be pulled off by the small spur wheels on the lower elevator shaft, and should any remain on the upper part of the stalk they will be pulled off by the reciprocating "snapper" between the elevator belts, such operation completing the clearing of the corn from the stalk. The ears are carried up by the elevator and discharged into the husker where the corrugated rollers engage them and tear off the husks, after which they are discharged into a box or receptacle (not shown) suitably attached to the under side of the husker.

Having thus described my invention, what I claim, and desire to secure by Letters Patent, is—

1. In combination, the main wheel and frame the forwardly projecting yoke frames, and arch bar arranged substantially as described, the shafts M M' arranged in pairs, the endless chain belts carried thereby, having picker fingers, and the loop fingers S' extended down into the passageway between the endless chain belts all substantially as and for the purposes set forth.

2. The combination of the main and wheel frame, the forwardly projecting yoke frames, the front arched bar, the trailing wheels journaled thereon, the shafts M M', arranged in pairs, the endless chain belts carried thereby, having connecting plates formed with picker fingers, the shafts M' toothed disks at their lower ends and the loop fingers S extended down into the passageway between the endless chain belts, all substantially as and for the purpose described.

3. In a corn husker, in combination the main frame and supporting wheels, the front arched bar E and the trailing wheels secured thereto, the yoke frames C C connected to the main frame and arched bar, the shafts M M' journaled in pairs, on such frames, the endless chains having connecting slats and picker fingers, mounted on such shafts, the guard plates O, the elevator and mechanism connecting such gatherer belts and elevator with the main axle whereby they are operated substantially as described.

4. In a corn husking machine the combination with the main frame and the drive wheel, said frame having forwardly projecting members, whereby to form a central stalk passage, horizontally arranged plates projected into such passageway at the bottom whereby to reduce the width thereof, gatherers operating in such passage, consisting of endless belts connected by plates having picker fingers, the stalk catching loop fingers S S, the elevator arranged to receive the corn ears from the gatherers and means for operating such gatherer and elevator all substantially as shown and described.

5. In a corn husking machine substantially as described, the combination with the main frame, the gatherer and separator mechanism supported at its front end and the husking devices supported on its rear end, of an elevator arranged intermediate the gather and husker mechanisms, adapted to carry the separated corn ears from the gatherers to the husker, said elevater having spur disks at its lower end rotating in the direction of the feed of the elevator all arranged substantially as shown and described.

6. In a corn husking machine, a husking mechanism comprising side walls formed of corrugated rollers, arranged longitudinally and in a plane parallel to the feed, said side walls converging toward the bottom whereby to form a trough like chamber and means for operating such rollers all substantially as and for the purpose described.

7. In a corn husking machine a husking mechanism formed of an open bottom trough like chamber, having its side walls formed of corrugated rollers, arranged longitudinally and in a plane parallel to the feed, and means for operating such rollers, substantially as and for the purposes described.

AUGUSTUS SMITH.

Witnesses:
HENRY SCHATY, Jr.,
JACOB KURLER.